United States Patent [19]

Gar

[11] 4,053,122

[45] Oct. 11, 1977

[54] FLAPPING WING AIRCRAFT

[76] Inventor: Konrad Gar, Haus Nr. 30, 8078 Nettelhofen, Germany

[21] Appl. No.: 651,528

[22] Filed: Jan. 22, 1976

[30] Foreign Application Priority Data

Jan. 27, 1975  Germany .............................. 2503177

[51] Int. Cl.$^2$ ............................................. B64C 33/02
[52] U.S. Cl. ..................................... 244/11; 244/22; 244/64
[58] Field of Search .................. 244/11, 22, 28, 64, 244/123; 416/69, 63, 230

[56] References Cited

U.S. PATENT DOCUMENTS

| 1,364,174 | 1/1921 | Bird | 244/22 |
|---|---|---|---|
| 1,450,480 | 4/1923 | Buck | 244/22 |

FOREIGN PATENT DOCUMENTS

| 544,120 | 9/1922 | France | 244/22 |
|---|---|---|---|
| 883,293 | 6/1943 | France | 244/22 |
| 622,992 | 2/1934 | Germany | 244/22 |
| 942,781 | 4/1956 | Germany | 244/22 |
| 240,866 | 10/1908 | Germany | 244/11 |
| 18,683 of | 1911 | United Kingdom | 244/22 |

*Primary Examiner*—Galen L. Barefoot

[57] ABSTRACT

A flapping wire aircraft capable of being operated by manpower comprising double wings acting in a countermovement is provided with a toggle lever system on each side for separate actuating the right-hand and left-hand wings respectively to improve steering possibilities; said toggle lever systems permitting increased wing flapping speeds. The wings are at least partially elastic and of a compact shape; according to a preferred embodiment circular-ellipticaly, rearward-outwardly extending wing spars are in an approximately parallel arrangement, the first of which following the front/side edge of the wing; these on substantially in flight direction arranged bearing spars attached wing spars guide sharing air portions to the rear, resulting in enhanced propulsion. A toggle lever system comprising parallel guides with an elastic connection such as a leaf spring results in an improved power transmission to a connecting rod of the wings; a spring member between the lever system and a fixed point on the frame forces the wings into volplane position when intentionally acting power is omitted.

15 Claims, 11 Drawing Figures

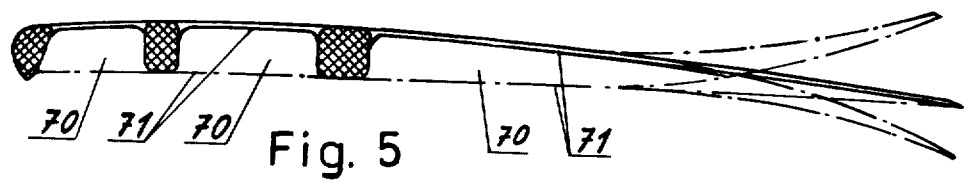
Fig. 5
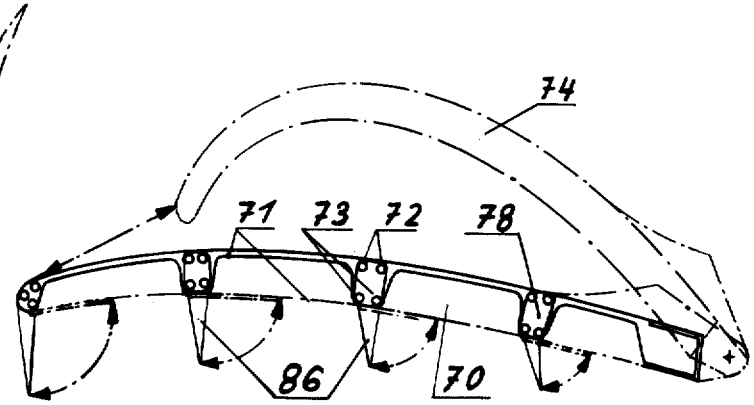
Fig. 6
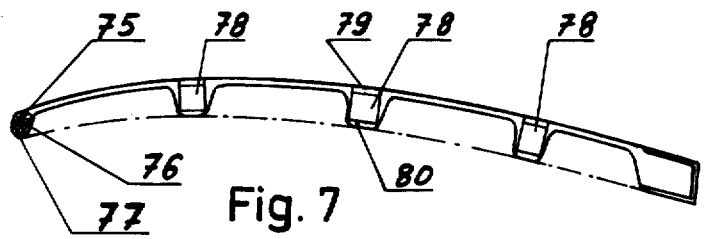
Fig. 7
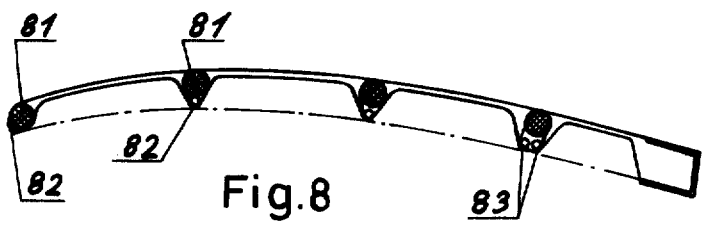
Fig. 8
FIG. 4

FLAPPING WING AIRCRAFT

The invention relates to a flapping wing aircraft with an aircraft fuselage, which provides accommodation at least for one person and/or burden, with flapping wings arranged laterally in superposed pairs comprising a volplane locking system and extending from bearing spars running substantially in the direction of flight, and which wings are adapted to be operated in opposite respective directions by means of a lever system.

BACKGROUND OF THE INVENTION

An aircraft of this type driven by muscular power is referred to in the French patent specification No. 883,293. Numerous other aircraft, usually intended for sporting purposes, have been developed for flight by manpower, with which in fact flights of up to several hundred meters have been achieved. The known aircraft are, however, extraordinarily unreliable. They are provided with disproportionately large wings, have poor manoeuvering properties and/or are relatively unserviceable for flying.

SUMMARY OF THE INVENTION

An improved flapping wing aircraft with improved flight properties has now been developed, which predominantly has an enhanced manoeuverability owing to independently operative right and left-hand wing actuation means respectively while an intentionally broad shape and elastic state of the wings with a novel arrangement of the wing spars lead to a gain in propulsion and to an increased lift not to be found in previously proposed flapping wing aircraft, the positively controlled opposite movement of each wing pair resulting in a counterbalance of weights and loads, so that the wings can be easily moved using a novel toggle-lever system with energy storing spring means.

More specifically the flapping wing aircraft in accordance with the invention is characterised by two mutually independent toggle lever systems for the mutually independent actuation of the wings on the right-hand and left-hand sides and tension and compression springs respectively for an automatic volplane setting of the wings (i.e. a wing attitude resulting in most effective transformation of falling power into drive-on movement; in the present case this means an almost horizontal attitude of the wings (compare FIG. 2 of the drawings). Preferably each wing has a circular-ellipticaly, rearwardly-outwardly running front/side edge and a straight or tailed rear edge perpendicularly orientated or inclined to the direction of flight and comprises a first or wing border spar following the front/side edge of the wing, parallel to which further circular-elliptically, rearwardly-outwardly running spars are arranged extending from the front part of the bearing spar to the rear edge of the wing in such a way that they dividie the rear edge of the wing into approximately equal distances; the wing spars being thus flexible at least at their outer (free) ends in one direction that the wing ends when subjected to increased pressure action from above upon the upward movement of the wing may be deflected yielding in a delayed upward movement of the wing ends; the wings being provided with a burdenable-tight top fabric, while the string or fabric of the bottom surfaces is thus elastic that troughs are formed between the spars on the underside of the wings when they are moved downwards, while during volplane a smooth undersurface if formed.

In a conventional manner an elevator is provided in prolongation of the fuselage.

Besides the improvement in manoeuverability, the invention achieves a reduction of power required for the upward movement of the wings owing to their particular elasticity, while for the downward movement the whole surface area comes into use and the then "inflated" bottom fabric of the wings provides for a favourable conduction of air to the rear.

The flapping wing aircraft in accordance with the invention may be operated by muscular power and thus would by very attractive for sporting purposes with regard to the relatively cheap and simple construction. Additionally it is, however, also possible to provide a wing actuating engine in a central carrying wing or plane.

Between the upper flapping wings a carrying wing or plane can be provided, which in accordance with an optional construction for rapid flight has a conventional laminar wing profile. Particularly the carrying wing may comprise a fore-wing and a take-off flap, which facilitates take-off. A connection of this take-off flap with the (elastic) flapping wing ends provides further assistance on take-off. The take-off flap may be actuated by a lever mechanism comprising further means for the upward pivoting of an undercarriage and displacement of the seat or support surfaces for the pilot, whereat the displacements of weights after taking-off from the ground may be balanced.

The swinging upwards of the undercarriage can be facilitated by additional tension springs. The lever mechanism for the take-off phase may be thus arranged that an actuation by the thighs becomes possible when the latter are drawn in towards the body or swung upwards respectively.

The actuation of the elevator which is preferably arranged to rear in the slipstream between the upper and lower wings or the (upper) carrying wing and the centre cover, may be optionally effected by hands or feet via tension levers or pedals using tension wires or ropes or the like. The elevator can be divided in the longitudinal direction and the right- and left-hand sections can be adapted to be controlled separately. Alternatively the elevator may be flexibly elastic and actuated by twisting the right and left portions against each other.

An important feature of the invention resides in the completely novel conception of the wings, which on the basis of the different forces acting and the selected particular flexibility coming into play on their actuation automatically perform bending movements, which facilitate flight. In the case of the new wings the carrying capacity is jointly procured by the fabric covering and the wing spars, for which reason the top fabric must have a suitable strength and consists for example of light canvas. The more flexible fabric of the bottom surfaces becomes inflated between the spars on a downward stroke and serves to provide an enhanced conduction of air to the rear, which improves the propulsion. During volplane with reduced force action the aerodynamically most favourable form will be established automatically. The fabric of the bottom surfaces should have a certain permeability to air. For this purpose an elastic tissue is suitable, which can be combined with strong material in the form of longitudinal strips.

The special wing spar flexibility in one direction was adopted to facilitate the raising of the wing accompanied by the smallest possible descending force. Owing to the downward deflection of the outer portion of the wing upon raising the actual surface area of the wing acted upon is reduced and air is led off to the outside by the change in shape with the least possible resistance. Moreover some bending upwards of the very ends of the wing spars in the first moment of the downward stroke (of the oppositely moving wing) could result in a certain reduction in the necessary force at the beginning of the stroke, whereat the more favourable momental variation in the lever mechanism also leads to a saving in force required upon stroke starting.

A further increase in propulsion and lift can be achieved by the arrangement of "air guiding pockets", i.e. fabric strips fixed with one edge at the bottom surface of the wing, which in the case of volplane lean against the bottom surface of the wing and in the case of a downward beat or stroke are opened by the thereupon produced air current.

The elastic construction of the wing spars and of the wing fabric furthermore provides adaptation possibilities of the aircraft to meet various requirements. Thus it is possible — by releasing or tightening upon the tension wires — to bring about an enlargement or a reduction in wing surface area and it is possible in the case of an outwardly inclined rear edge of the wing to bring about a displacement of the centre of lift to compensate for changes in load or in the case of reception of burden in the aircraft.

The wing spar ends are preferably extractable, permitting a variation of the wing rear edge, which may be perpendicular to the longitudinal axis of the aircraft or inclined to the front or to the rear or can have a tailed shape. As an additional result over the adaptation to variations in loads it is thus possible to alter the minimum or maximum speeds of the aircraft.

Preferably the wing spars are adapted to swing inwards in order to decrease the size of the premises required for storing the aircraft.

Further particular features of the invention will be gathered from the claims and the following description of embodiments, which refers to the attached drawings.

BRIEF DESCRIPTION OF THE FIGURES

FIG. 4 is a section through a flapping wing along line I—I of FIG. 3.

FIG. 5 is a section through the wing along line II—II of FIG. 3.

FIGS. 6 to 8 show various embodiments of the wing as sections along the section line III—III of FIG. 3.

FIG. 1a and 1b is a diagrammatic sketch of the elevator.

DETAILED DESCRIPTION OF THE FIGURES

Figure 1:
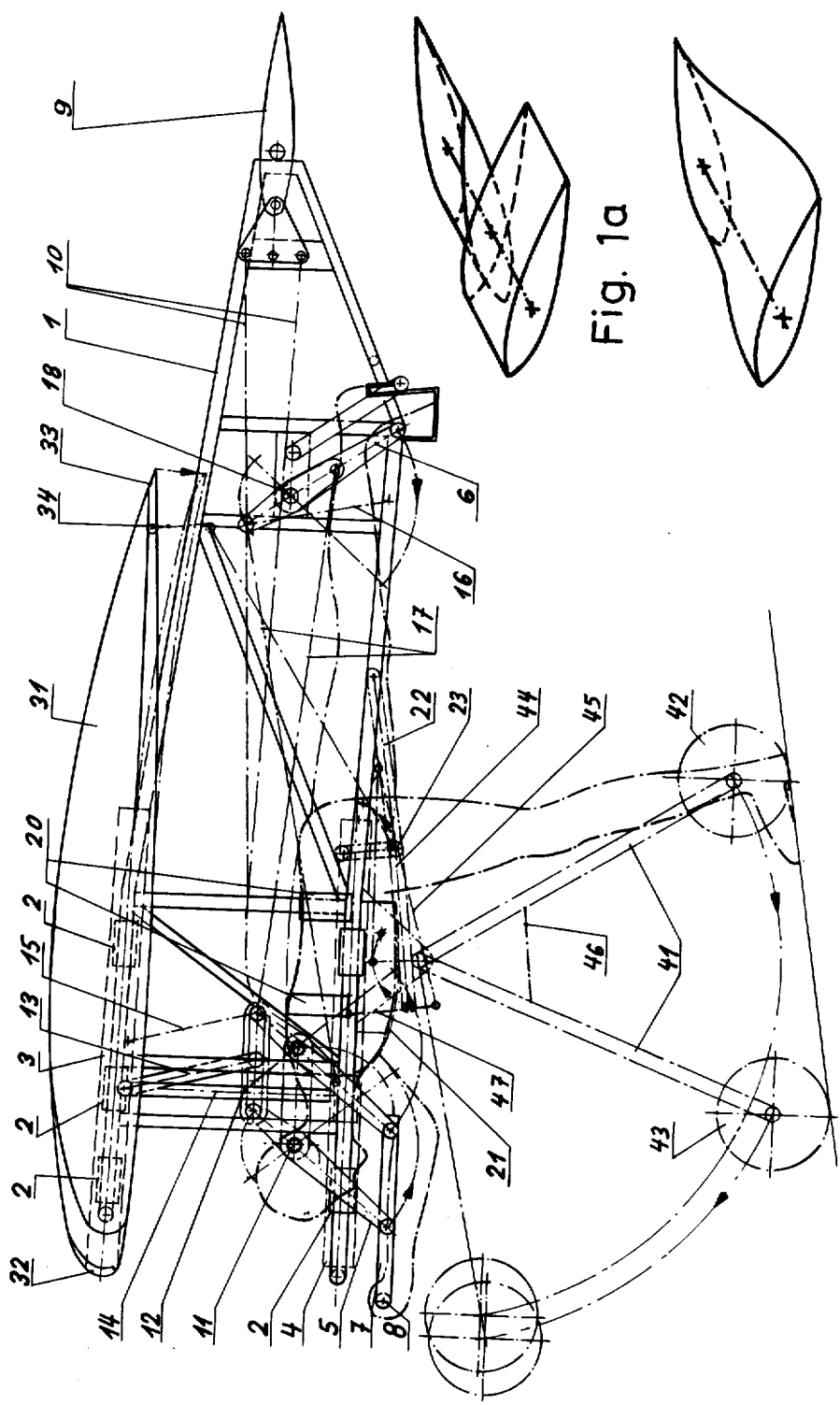
FIG. 1 is a side-view of the aircraft fuselage.

The aircraft fuselage shown in FIG. 1 consists conveniently of a light-weight tube trussed frame 1, which can be constructed so as to be capable of being disassembled for transport purposes. It comprises the wing bearing spars 3 and 4 with the bearings 2. The parallelly arranged lever mechanisms for hand and foot drive respectively 5 and 6 comprise the push-pull lever 7, which forms the lower member of an articulated quadrilateral or its extension. Pivoting handles 8 are combined with the lever 7 for actuating the elevator 9 via the wires or ropes 10. By means of shafts 11 the lever forces are transferred outwards under the wing bearing spars 3, the upper member or, respectively, the upper parallel guide 12 of the articulated quadrilateral being constructed as a double leaf spring and carrying the connecting rod 13 (see also FIG. 2.) forming a connection with the upper wing bearing spar 3 (via the outwardly directed arm of the two-armed lever 14b). The connecting rod 14 connects the inwardly directed arm of the lever 14b with the crank arm 14a of the lower wing bearing spar 4. The springs 15 and 16 always tend to urge the lever mechanisms 5 and 6 into a rest position (volplane setting of the wings), the right or respectively left lever system causing an upward and downward and upward movement of the upper wing and, respectively, a downward movement of the lower wing when it is pulled from one position to another. As a result the possible flapping speed might be enhanced by this toggle lever system permitting two strokes of each wing per full cycle of action by the pilot.

Figure 2:
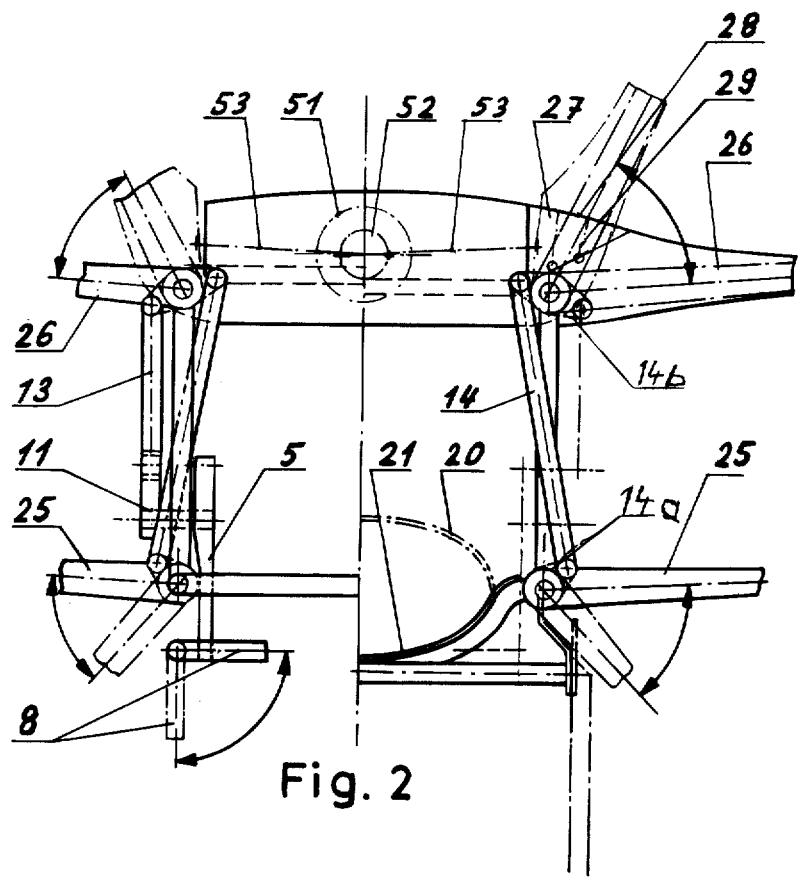
FIG. 2 is a diagrammatic front view of an aircraft centre part with the substantial actuating elements of the wings, the support cushion and the undercarriage being omitted on the left-hand side but traced on the right, where in turn the front linkage is omitted.

Preferably the opposite movement of the wings 25 and 26 is limited as shown in FIG. 2 by the volplane position.

By means of tension wires or ropes 17 force is transmitted from the foot lever mechanism 6 to the hand lever mechanism 5, the former could be disconnected if required by means of a coupling 18.

The fixing straps 20 with the support cushions 21 are mounted on a slide carriage, whose displacement is governed by the levers 22 and 23 in accordance with the movement of the thighs of the pilot.

For enhanced lift a forewing 32 and a take-off flap 33 are provided on the carrying wing 31, the take-off flap 33 being actuated by means of a tension wire or rope 34 using the lever 22.

The undercarriage 41 is provided with the load carrying wheels 42 and a front wheel 43. It is placed close to the centre of gravity of the aircraft and can be pivoted upwards. Such upward pivoting is effected by the levers 23 and 44, the spring 45 both facilitates the upward pivoting and also fixes the undercarriage in position. The tension springs 46 and 47 ensure elastic resilience of the undercarriage when it engages the ground on landing.

The FIG. 2 furthermore shows means for bridging or fairing the necessary pivoting space 27 on the upper flapping wing (from the carrying wing profile to the flapping wing profile) by means of an elastic cover or fabric covering 28, which is brought by pivoting holding wires 29 into a suitable shape.

In the centre of the aircraft in the upper carrying wing a motor 51 is traced which may additionally act on the flapping wings.

The driving force of the engine could be transferred to the bearing spars in a known manner via two transmissions 52 and disengageable connecting rods 53 fitted on the bearing spars. The transmissions might be operated independently of each other for the purpose of navigation via the flapping wings, a one-sided change of flapping height and frequency being possible.

Figure 3:
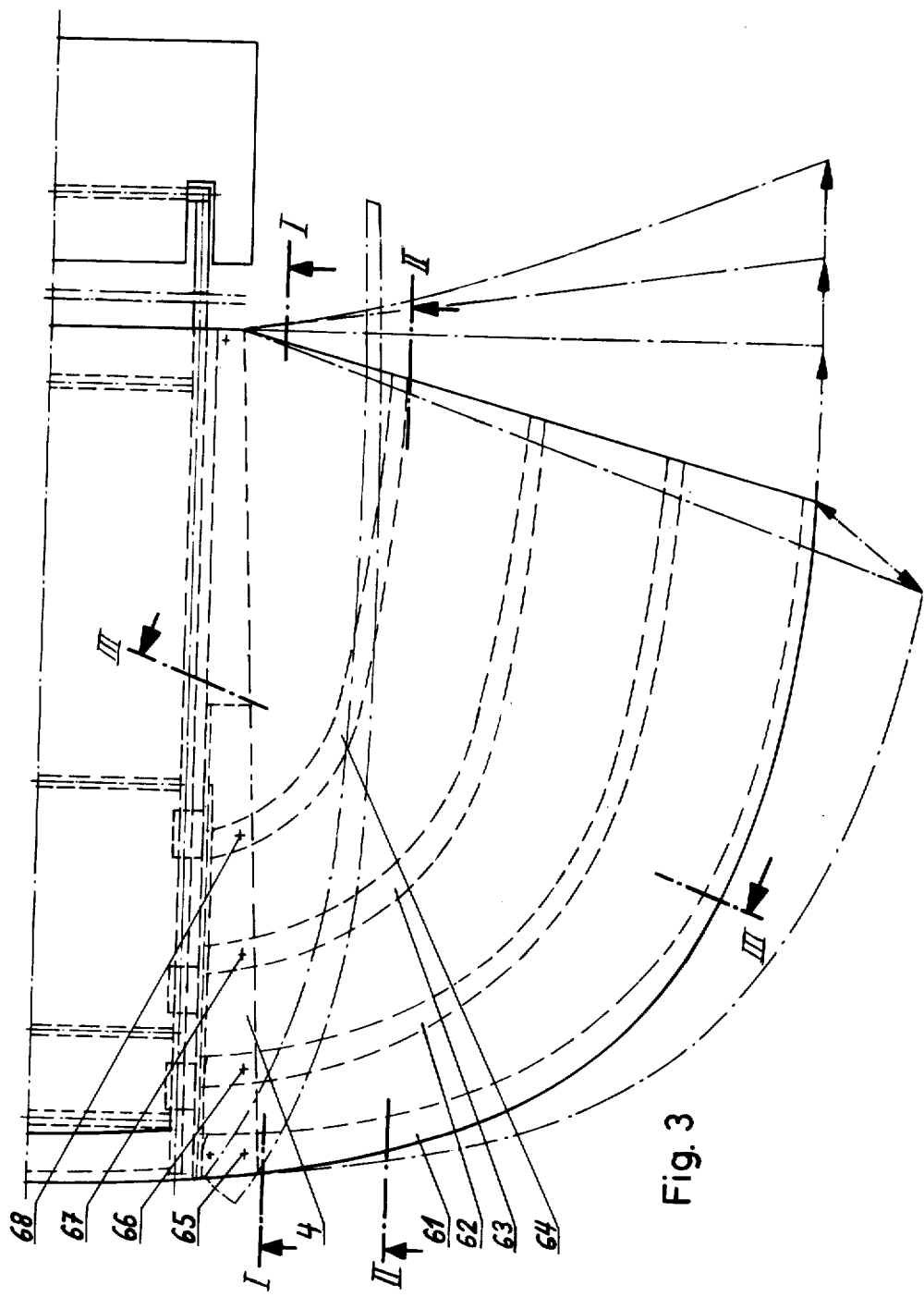
FIG. 3 is a plan view of the left-hand section of the aircraft.

The flapping wing shown in FIG. 3 comprises the wing spars 61, 62, 63 and 64, which are curved from the points of attachment 65, 66, 67 and 68 in a circular-elliptic manner to the outside and to the rear. The points 65, 66, 67 and 68 of attachment are substantially arranged in the front half of the wing bearing spar 4, dividing this front section into distances of about one fifth between the first and the second wing spar (61,62) and of about two fifths either between the second and third and the third and fourth wing spar (62 and 63; 63 and 64) respectively.

FIG. 4 shows the gradual transition from the carrying wing profile (approximately laminar) to the flapping wing profile. FIG. 5 shows the purely flapping wing profile and the troughs or cavities 70 produced on a downward stroke of the wing but equalized in the case of volplane by the elastic fabric.

FIGS. 6 and 8 show in particular different embodiments of the wing spars, which in accordance with FIG. 6 are made of tapering, flexible round rods 72, 73 combined to a box or triangular profile. By manufacture of the upper round rods 72 of elastic stretching material, whose return or resilience is limited, for example, in a known manner by arranging sleeves or pressure pins it is possible to keep the wing comparatively stiff in the case of a downward stroke while in the case of an upward stroke (indicated by 74) it is comparatively flexible.

86 are air guide pockets which can be arranged if desired and which only open in the case of a downward stroke, while in the case of volplane they lie against the lower fabric.

Among the wing spars 78 of FIG. 7 the first or outer spar 75 is made of an elastic bar, whose top section or half 76 is extensible but little compressible, while the bottom section 77 can be compressed but cannot be stretched to any great extent. A furthe alternative wing spar construction is shown by the inner wing spars 78, which consist of two strips 79, 80 combined to one profile, the top strip 79 being extensible.

The wing spars shown in FIG. 8 comprise at the top tapering round rods or tubes 81 of rubber or elastic plastics having underneath attached wire-like stiffning girders 82 or girders 83 preferably of spring wire or plastics with similar properites, so that in this case as well flexibility in the case of an upward stroke and deformation resistance in the case of a downward stroke are ensured.

Figure 9:
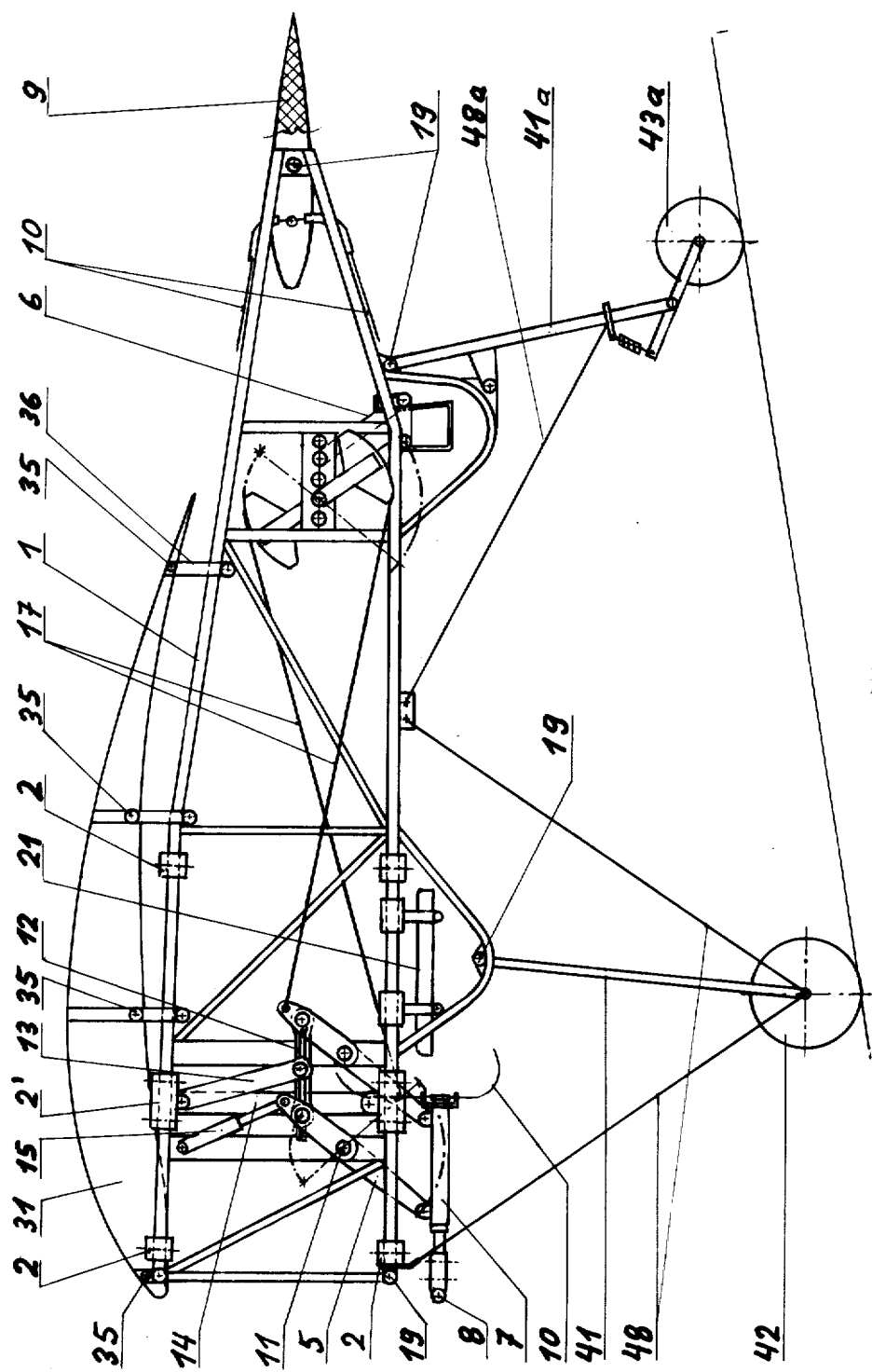
FIG. 9 shows a further simplified embodiment (side-view, without flapping wings).

The slow flight aircraft shown in FIG. 9 (for those parts corresponding to similar parts of FIGS. 1 and 2 the same reference numerals are used and they are here not explained again) has a dismountable fuselage comprising a left-hand and a right-hand lattice frame 1, these frames being connected or screwed together by means of transverse struts 19 and 35 respectively which can be plugged into position. At the bearings 2 and 2' the wings are flange-mounted; the connecting rod 13 acts on a two-armed lever constructed so as to extend from the centre upper bearing 2'.

The compression spring 15 always urges the lever mechansim 5 into a rest position so that the flapping wings are held in the volplane setting in the case of each end terminal position of the levers. By means of connecting ropes 17 transmission of force from the foot lever mechanism 6 to the hand lever mechanism 5 is performed.

The support cushion 21 is screwed to flanges between the two frames and these flanges can be displaced for a precise adjustment of the centre of gravity or weight counterbalance.

At the same level as the upper flapping wing a rigid support or carrying wing 31 is provided, which carries the upper connecting struts 35 and is arranged with plugged flanges 36 between the two frames 1.

The foot lever mechanism 6 can be somewhat shifted forwards and backwards from the shown centre position by plugging in order to provide adaptation to the different stature of the flyers. Furthermore the pivoting tension lever 8 can be somewhat displaced forwards or backwards utilizing several threaded holes. The undercarriage 41 with two supporting wheels is arranged somewhat in front of the centre of gravity on the frame 1 and is fixed by means of holding wires 48 in the most favourable position. The lever mounted tail wheel 43a serves for providing resiliency and is mounted on supports 41a, which are held by tension wires 48a preventing them from snapping off.

What is claimed is:

1. A flapping wing aircraft comprising an aircraft fuselage, two superposed pairs of flapping wings extending laterally from substantially in flight direction orientated bearing spars and a lever system for actuating the wings in opposite respective directions and comprising means for locking the wings in a horizontal volplane position, the lever system further comprises two mutually independent toggle lever systems for the mutually independent actuation of the wings on the right-hand and left-hand sides respectively, the wings being at least partially elastic and of a broad shape.

2. A flapping wing aircraft according to claim 1, characterized in that the wings have a circular-elliptically, rearwardly-outwardly running front/side edge, each wing comprising a first wing spar following the front/side edge of the wing and parallel to this first wing spar further circular-ellipitically, rearwardly-outwardly running wing spars extending from the front part of the bearing spar to the rear edge of the wing in such a way that they divide the rear edge of the wing into approximately equal distances; the wing spars being thus flexible at least at their outer (free) ends in one direction that the wing ends when subjected to increased pressure action from above upon the upward movement of the wing may be deflected yielding in a delayed upward movement of the wing ends; the wings being provided with a burdenable-tight top fabric, while the fabric of the bottom surfaces is thus elastic that troughs are formed between the spars on the underside of the wings when they are moved downwards.

3. A flapping wing aircraft according to claim 2, characterized in that the wing spars are formed by thick wires which are connected by thin elastic wire braces to a box profile; on the top-side of the spar there are preferably two wires while on the bottom-side only one wire is preferred for the inner spars and two are preferred for the first or border spar.

4. A flapping wing aircraft according to claim 2, characterized in that the wing spars consist of elastic solid bars, the upper part of which is extensible but cannot be compressed while the lower part can be compressed but cannot be stretched.

5. A flapping wing aircraft according to claim 2, characterized in that the wing spars consist of two assembled straps forming a single girder, the upper strap being extensible and especially formed of elastic tapering round girders, on the bottom side of which a wire-like flexible girder is arranged for stiffening in one direction.

6. A flapping wing aircraft according to claim 2, characterized in that each wing actuation system comprises a connecting rod between a lower wing crank arm and one first arm of a two-armed upper wing rotary lever, the second arm of which being engaged by a connecting rod engaging at the other end a rigid-elastic leaf spring forming the upper memeber of an articulated quadrilateral, whose lower member is extended towards an actuating lever, while the sides of the quadrilateral are formed by two-armed levers pivoting on the fuselage; a disconnectable foot actuating means being connected with the articulated quadrilateral via tension opens, and an automatic spring setting of the wings in volplane position being provided at each actuating system by an adjusted spring connection between a fixed point of the fuselage or framework and the two-armed sides of the quadrilateral.

7. A flapping wing aircraft according to claim 2, characterized in that the depth (in the direction of flight) of the wings is approximately the same as the span of the wings.

8. A flapping wing aircraft according to claim 6, characterized in that the opposite upward movement of the upper wing and the downward movement of the lower wing respectively start from the volplane setting.

9. A flapping wing aircraft according to claim 1, characterized in a carrying wing between the upper flapping wings, the cross ssection of these upper flapping wings being gradually varied from the carrying wing profile to a purely flapping wing profile and the evolution space of the upper flapping wings being bridged by an elastic covering, elastic holding wires providing a leveled shape in the case of volplane.

10. A flapping wing aircraft according to claim 2, characterized in that the positions of the wing spat attachments on the wing bearing spar are thus arranged that the distance between the two first positions, taken from the front of the aircraft, is smaller than the distances between the following attachment points.

11. A flapping wing aircraft according to claim 2, characterized in that approximately the rear third of the wing spars is flexible in an upward direction.

12. A flapping wing aircraft according to claim 2, characterized by air conducting guide pockets on the bottom side of the wing which evolve during a downward stroke of the wing, but lie against the bottom side of the wings in the case of volplane.

13. A flapping wing aircraft according to claim 2, characterized in that the wing bearing spars as seen from the side are inclined from the front of the rear towards each other.

14. A flapping wing aircraft according to claim 1, characterized by an elevator in extension of the fuselage, which elevator being divided in the longitudinal direction such that the right-hand and left-hand halves could be actuated independently of each other, 15. A flapping wing aircraft according to claim 1, characterized by a flexible elastic elevator with an actuating system for twisting the right-hand and left-hand halves against each other.

* * * * *